Dec. 25, 1956  F. W. ROCKWELL  2,775,336
SLITTER FOR FORMING BODY BLANKS FROM SHEETS
Filed Dec. 4, 1952  5 Sheets-Sheet 5
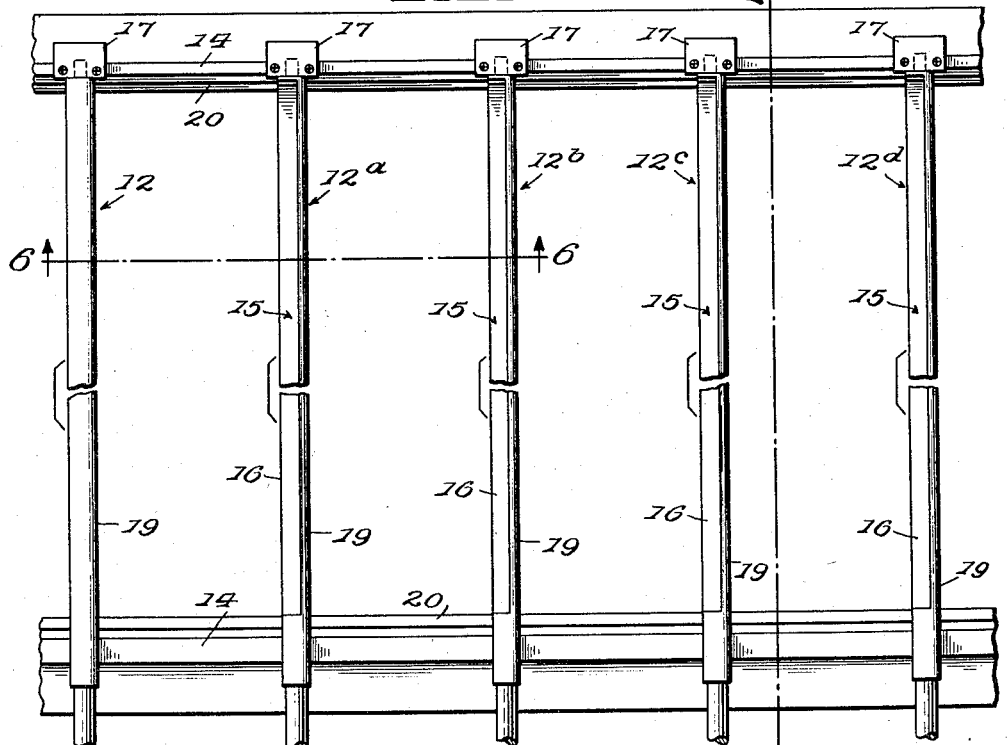
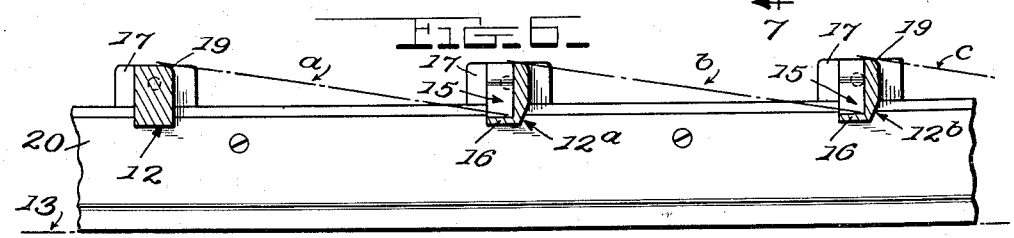
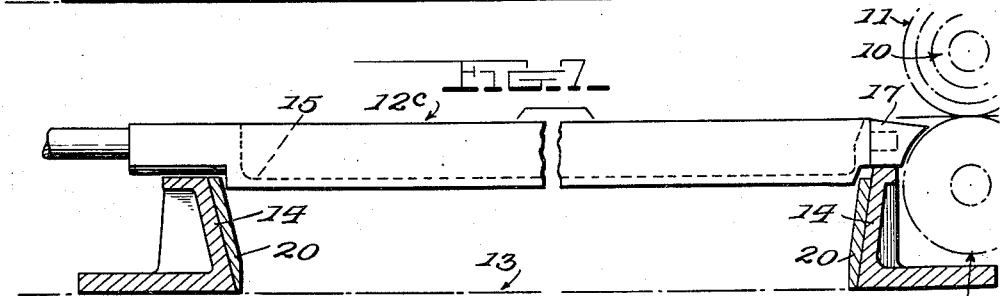
INVENTOR.
F. W. Rockwell
BY
Mason, Porter, Diller & Stewart
attys.

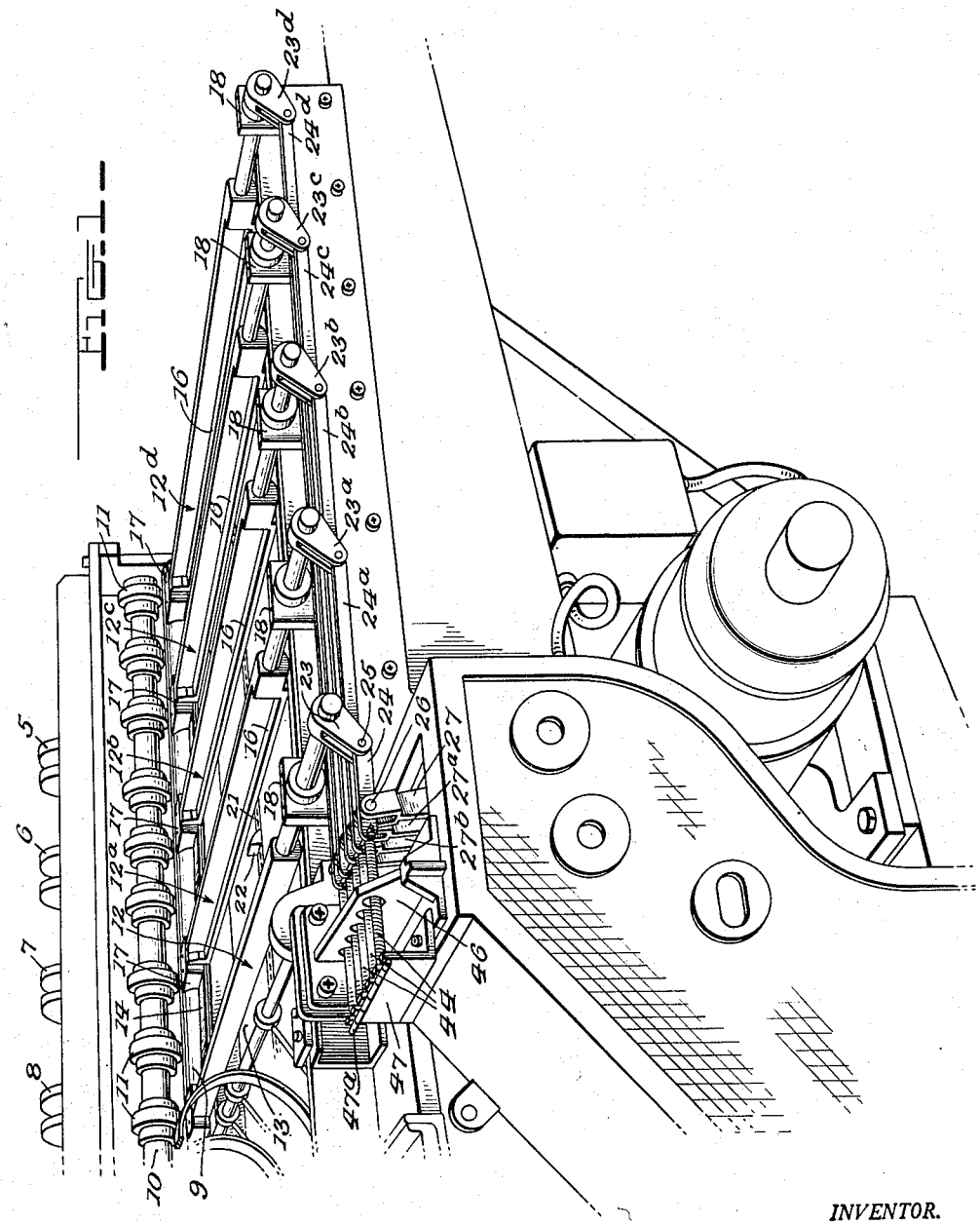

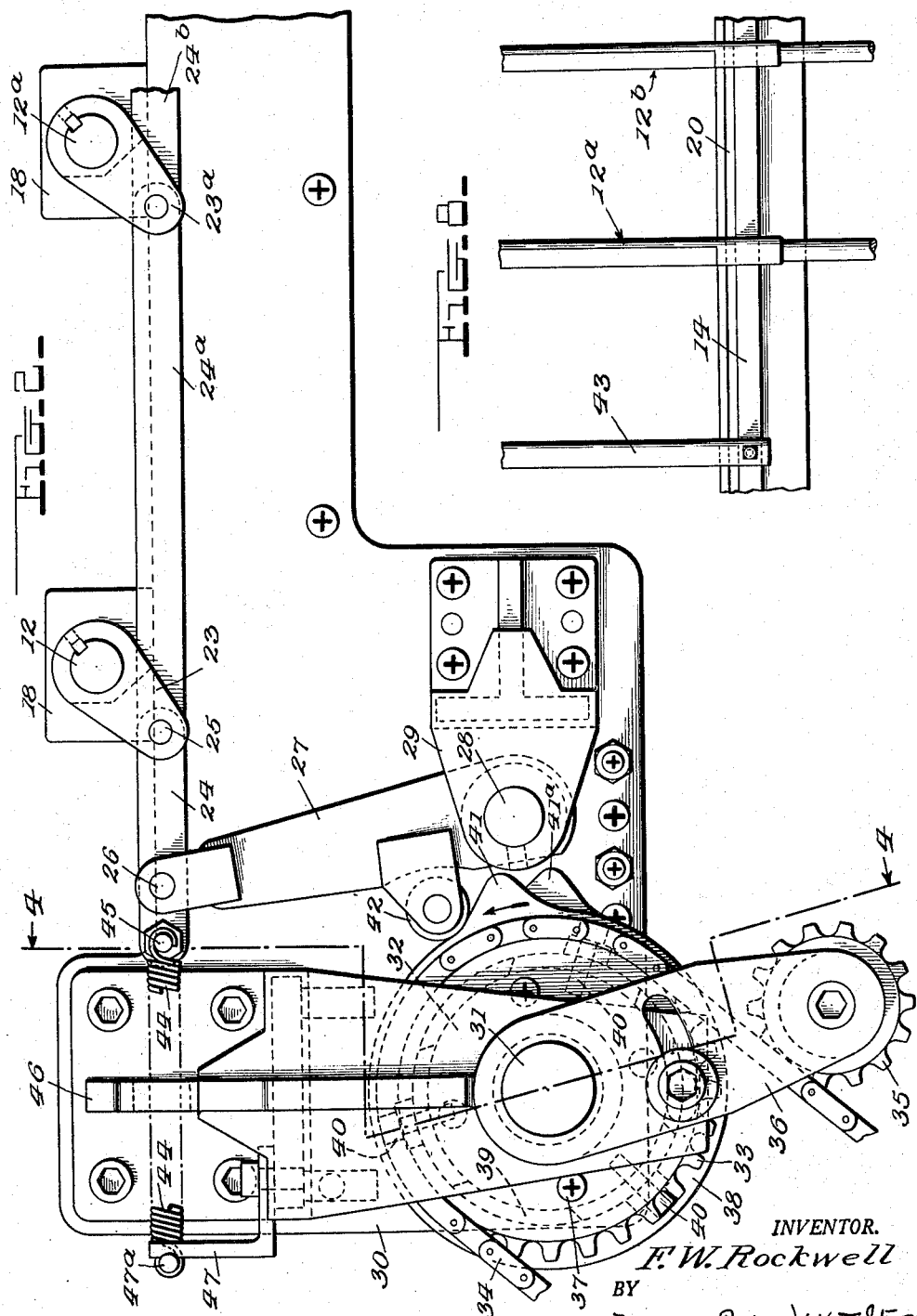

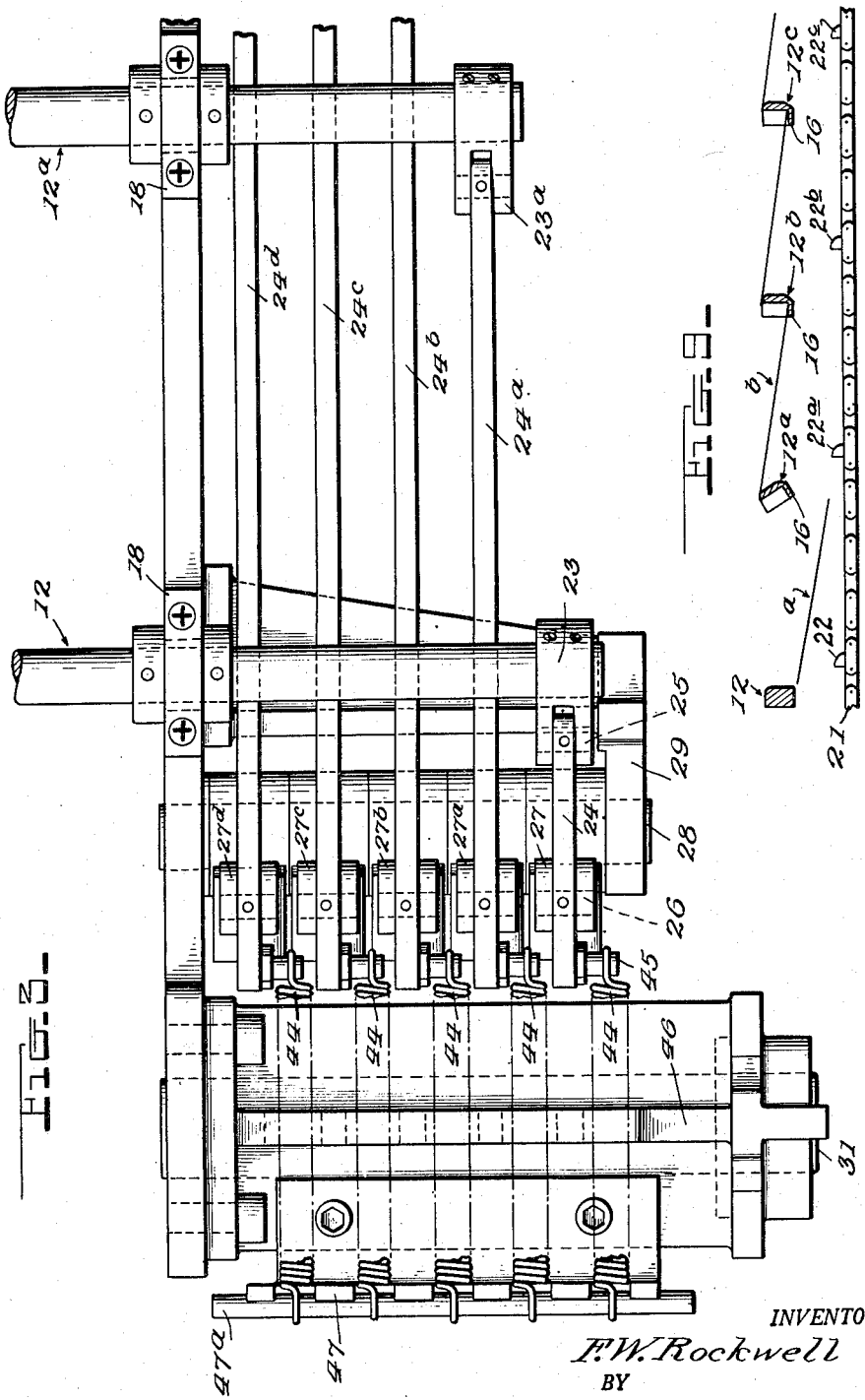

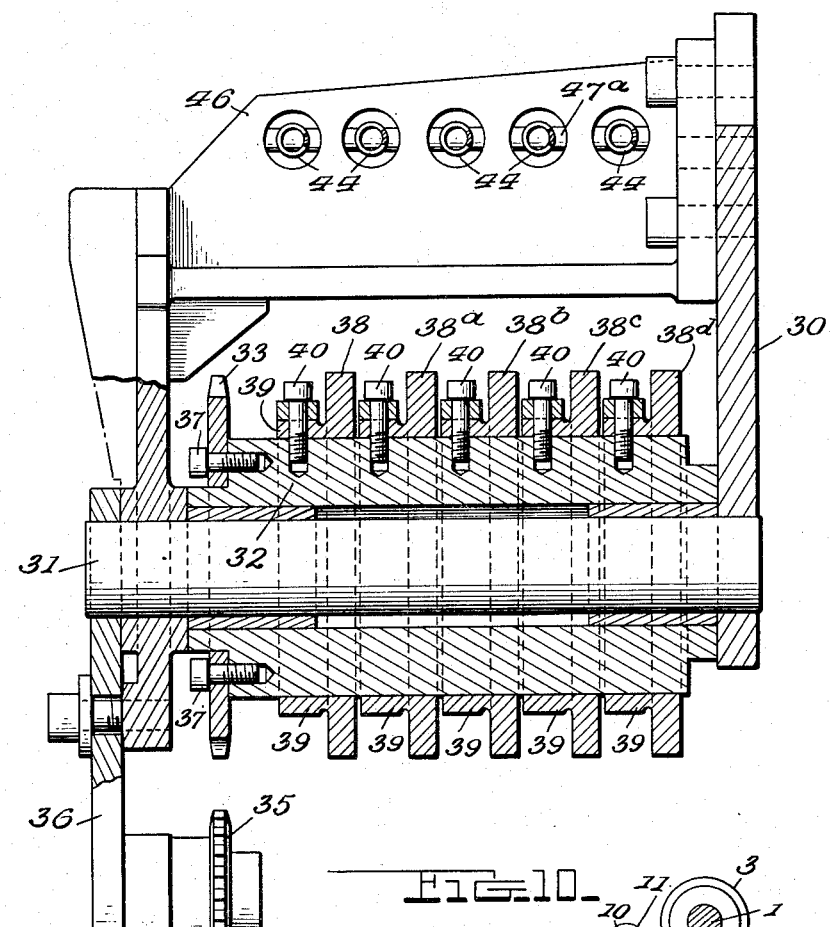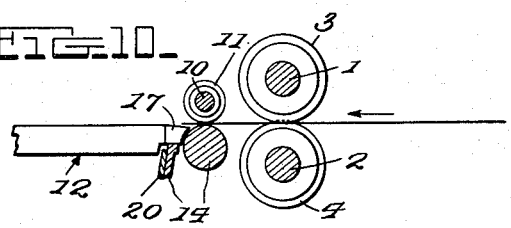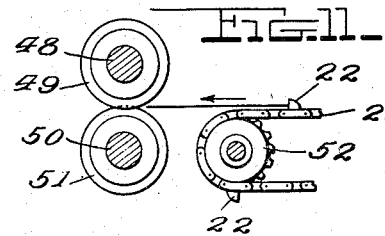

United States Patent Office 2,775,336
Patented Dec. 25, 1956

2,775,336

SLITTER FOR FORMING BODY BLANKS FROM SHEETS

Fredrick W. Rockwell, Milwaukee, Wis., assignor to Continental Can Company, Inc., New York, N. Y., a corporation of New York Application December 4, 1952, Serial No. 323,971

6 Claims. (Cl. 198—34)

The invention relates to machines for slitting sheets and in particular for slitting sheets of tin plate or the like for forming blanks used in the making of can bodies. Machines for this purpose are well known. They usually include a pair of arbors having slitting cutters for simultaneously cutting a sheet into a plurality of strips. The strips pass through transfer rolls which project the strips into a guideway which directs the strips to a second pair of arbors arranged at right angles to the first pair of arbors and having cutters for cutting the strips into body blanks. Feed dogs moving along the guideway engage the strips at the trailing side thereof and feed the same in succession and in spaced relation to the blank forming cutters.

The patent to Dodge et al. No. 1,985,820, granted December 25, 1934, is an example of the type of machine referred to. In the Dodge machine there are rods extending across the guideway and disposed relative to the slitting cutters so that the advance edge of each strip is moved by the transfer rolls along a rod. The trailing edge of the strips are not supported and as soon as the strips are released from the transfer rolls they will simultaneously slip from the rods and drop into the guideway. The feed dogs in order to feed the strips one after another in succession and in spaced relation are spaced a greater distance apart than the width of the strips. The feed dogs may be timed so that the first strip, that is the strip nearest the blank cutters, will drop in front of the feed dog and slide laterally into abutted relation therewith. The second strip, will drop in front of the feed dog which is to engage it and move it into the blank cutters but it will also fall onto the feed dog in advance thereof. The third strip will fall onto the feed dogs at even a greater distance from the feed dog which is to move it and overlap the advance dog to a greater distance. This is very objectionable for the reason that the sheets in sliding into engagement with the feed dog with which it is to be moved is likely to be scratched by the advanced feed dog on which it rests.

An object of the present invention is to provide a machine of the above type with a means disposed above the guideway for receiving and supporting the strips as they are projected from the transfer rolls and also to provide a means for releasing the strips from the supporting means one at a time in succession in timing with the movement of the feed dogs so that the strips will fall into the guideway immediately in front of the feed dog which is to engage the trailing edge thereof and at no time will the strip fall onto the advance feed dog and slide therefrom.

A further object of the invention is to provide a machine of the above type with rocker bars extending over the guideway for receiving and supporting the strips and a cam actuating means for rocking said bars in succession and in timing with the movement of the feed dogs so that the strip will fall into the guideway between the feed dogs and immediately in front of the feed dog which is to engage the trailing edge of the strip for feeding the same to the cutters which sever it into can body blanks.

A further object of the invention is to provide a machine of the above type having a cam actuating means for each rocker bar wherein each cam may be independently adjusted for varying the timing of the rocker bar actuated thereby relative to the movement of the feed dog which is to engage the strip released by said rocker bar.

A still further object of the invention is to provide rocker bars for a machine of the above type wherein each rocker bar is provided with a ledge at the lower side thereof for supporting the trailing edge of a strip and a rounded surface at the upper side thereof for supporting the advance edge portion of the following strip.

In the drawings which show by way of illustration an improvement in the means for handling the strips after they leave the transfer rolls preparatory to the feeding of the strips to the blank forming cutters:

Figure 1 is a perspective view showing the improved means for receiving and supporting the strips as they are fed from the slitting cutters and the releasing means which releases the strips one at a time and in spaced relation for immediate engagement by the feed dog which feeds the same to the blank forming cutters.

Figure 2 is an end view of the rocker bars showing the arms carried thereby, the links attached thereto, the levers for operating the links, the shaft, for supporting the operating cams and the cams in side elevation.

Figure 3 is a plan view showing the operating means for the rocker bars.

Figure 4 is a sectional view on the line 4, 4 of Figure 2.

Figure 5 is a plan view showing the rocker bars for supporting the strips.

Figure 6 is a sectional view on the line 6, 6 of Figure 5.

Figure 7 is a sectional view on the line 7, 7 of Figure 5.

Figure 8 is a view in plan of a modified form of the bars for supporting the strips wherein the first bar at the advance sides of the strips is stationary.

Figure 9 is a view showing diagrammatically the rockers and the feed dogs for receiving the strips from the rockers and feeding the same to the blank forming cutters wherein one of the rockers has been oscillated so as to release a strip supported thereby in timing to engage immediately in advance of the feed dog which feeds the strip to the blank forming cutters, the other blanks being retained and released in succession and in timing with the feed dogs which are to engage the same.

Figure 10 is a view showing more or less diagrammatically and in section the arbors and slitting rolls supported thereby which constitute the first operation cutters and there is also shown in this figure diagrammatically the transfer rolls which receive the strip from the first operation cutters.

Figure 11 is a view showing more or less diagrammatically and in section the arbors of the second operation rolls and the cutters supported thereby for dividing the strips into body blanks.

The present invention has to do with an improvement in a machine for slitting a sheet into strips and then cutting the strips into body blanks. The machine includes a pair of arbors on which are mounted slitting cutters. In the machine there are three slitting cutters which divide the sheet into four strips. The strips, after leaving the slitting cutters passes through transfer rolls and are fed thereby over a table having parallel guides forming a guideway which receives the strips and directs the same by a transverse movement to the blank cutting slitters. The transfer rolls project the strips onto rocker bars, each rocker bar has a supporting ledge for supporting what would be the trailing edge of the strip as it is fed to the blanking cutters.

The advance edge of the strip is supported on a rounded surface of an adjacent rocker bar. Movable lengthwise of the guideway are feed dogs which are spaced and timed so as to feed the strips one at a time in succession and in spaced relation to the blank forming cutters. These rocker bars support the sheet above the traveling feed dogs and they are oscillated independently by a cam actuating mechanism which rocks the bars so as to release the strips one at a time so that they will drop into the guideway and immediately in front of the feed dog which is to engage the same and move the strip into the blank forming cutters.

In Figure 10 of the drawings there is illustrated a portion of a machine of the type referred to above which portion includes the novel features of the present invention. The first operation cutters for cutting the sheet into strips include a pair of arbors 1 and 2 each of which is provided with a plurality of cutting discs 3 and 4 which cooperate in slitting the sheet. As illustrated in Figure 1 the sheet is cut into four strips and these arbors may be equipped with cutters for trimming the sheet as well as slitting it into strips. The upper portion of one of the trimmers is indicated at 5 in Figure 1, and the upper portions of the slitting cutters are indicated at 6, 7 and 8. These slitters and trimmers are of the well-known construction and further description thereof is not thought necessary. It may be stated, however, that they are of the general construction of the slitters shown in the Dodge patent supra, but there are three slitters instead of two. The sheets after they leave the first operation slitters pass through transfer rolls.

As shown in Figure 1 the lower roll 9 is of uniform diameter while the upper roll 10 is provided with individual feeding discs 11, 11. The sheets are discharged by the transfer rolls onto rocker bars 12, 12$^a$, 12$^b$, 12$^c$ and 12$^d$ which extend over a table 13 carrying spaced guides 14, 14 which form therebetween a guideway for for the strips, and the rocker 12$^a$, 12$^b$, 12$^c$ and 12$^d$ are recessed substantially from one end thereof to the other as indicated at 15. At the bottom of the recess 15 is a supporting ledge 16. These rockers are pivoted at their inner ends in bearing blocks 17. They are also pivoted at their outer ends in bearing blocks 18. This ledge is disposed below the pivotal axis of the rocker bar. The rocker bar at the upper side thereof is curved as indicated at 19. The recess 15 in these rocker bars 12 is of a length substantially equal to the length of the strip which is to be supported thereby. The guides 14 have facing strips 20 which are slightly tapered so that when the ends of the strips pass along these tapered faces they will drop onto the table in endwise alignment for the feeding of the same to the blank cutting slitters. The rockers are spaced from each other so as to support the strips. The strips are indicated by a broken line in Figure 6 of the drawings.

The strip indicated at $a$ may be referred to as the No. 1 strip and will be the first strip which is fed to the blank cutting slitters. As this strip $a$ passes from the transfer rolls it will be fed along the rockers 12 at the advance edge thereof and as soon as it is free from the transfer rolls the trailing edge will drop onto the ledge 16 of the rocker 12$a$ which extends along the side of the blank which is to be the trailing edge portion.

The strip $b$ as it passes from the transfer rolls will be supported at what is to be its advance edge on the upper curved surface of the rocker 12$^a$. When the blank $b$ leaves the transfer rolls then its trailing edge will drop onto the ledge 16 of the rocker 12$^b$.

These rocker bars are independently oscillated and when the rocker bar 12$^a$, for example, is oscillated so as to move the ledge 16 out from under the trailing edge of the strip $a$, it will drop into the guideway as shown in Figure 9. Extending centrally of the guideway and below the surface thereof is a chain 21 carrying a series of feed dogs 22, 22$^a$, 22$^b$, and 22$^c$ which extend above the surface of the guideway. These feed dogs are spaced a slightly greater distance than the width of the strips so that the strips will be fed one at a time and in spaced relation to each other to the blank cutting slitters. The feed dogs are timed so that when the strip $a$ is released it will fall between the feed dogs 22 and 22$^a$, and immediately in advance of the feed dog which engages the trailing edge. Inasmuch as the ledge on the rocker bar releases the strip first and it slides off from the rocker at its other side, the strip will fall in an inclined position and the trailing edge will contact with the guideway first and as the strip moves down into contact with the guideway the trailing edge will be brought into contact with the feed dog 22$^a$.

It will be noted in Figure 9 that the strip $b$ is still supported by the rocker. The rocker 12$^b$ will be oscillated in timing with the feed dog 22$^b$ which is to engage the trailing edge of the blank $b$. The same is true of the strips $c$ and $d$. The rocker supporting the same will be oscillated in timing with the feed dog that is to engage the trailing edge of the blank so that the blank will drop immediately in front of the feed dog.

Each feed rocker on the outer end thereof has rigidly attached thereto a forked arm 23. There is a link 24 pivoted at 25 between the forked ends of the arm 23. This link 24 adjacent its outer end is pivoted at 26 to a lever 27 which in turn is pivoted at 28 to a supporting bracket 29 attached to the frame of the machine.

Also attached to the frame of the machine is a supporting bracket 30 carrying a cylindrical bearing rod 31. Mounted for rotation on this rod 31 is a sleeve 32. Attached to the left hand end of the sleeve as viewed in Figure 4 is a sprocket wheel 33. This sprocket wheel is driven by a sprocket chain 34 from a suitable source of power. Associated with the sprocket chain is an idler 35 mounted on an adjustable bracket 36 for taking up slack in the chain. The sprocket wheel is secured to the sleeve 32 by means of bolts 37, 37 and it is through this sprocket wheel that the sleeve is rotated in a counterclockwise direction.

Mounted on the sleeve is a cam disc 38. The cam disk has a flange 39 extending laterally therefrom and bolts 40 passing through slots in the flange 39 are threaded into the sleeve. These slots through the flange permit the adjustment of the cam on the sleeve in a circumferential direction. The cam 38 has a radial projection 41. The lever 27 is provided with a roller 42 which lies in the path of rotation of the cam projection 41. When the cam is rotated from the position shown in Figure 2 in a counterclockwise direction it will engage the roller 42 and cause the lever 27 to swing to the right and this will oscillate the rocker arm 23 on the rocker bar 12. Inasmuch as the rocker bar 12 which supports the strip $a$ does not in turn support the trailing edge of another strip there is no real purpose in providing this rocker bar with a ledge or in fact, instead of oscillating this first rocker bar, it might be a stationary bar as indicated at 43 in Figure 8 of the drawing.

It is essential, however, that the rocker bars 12$^a$, 12$^b$, 12$^c$ and 12$^d$ be oscillated in order to release the blank supported thereby. Each of these rocker bars has an arm similar to the arm 23 which is rigidly attached thereto. The arm on the rocker bar 12$^a$ is indicated at 23$^a$ and the link attached thereto is indicated at 24$^a$. The link 24$^a$ is connected to a lever 27$^a$ that cooperates with a cam 38$^a$. Likewise, the link 24$^b$ connected to the rocker 12$^b$ is in turn connected to a lever 27$^b$ and this lever is operated by the cam 38$^b$. Similarly, the link 24$^c$ operating the rocker 12$^c$ is actuated by a cam 38$^c$. The link 24$^d$ is connected to a lever 27$^d$ which in turn is actuated by the cam 38$^d$.

From the above it will be noted that the rockers are all oscillated independently by cams on the sleeve 32. The cam actuating projection on the cam 38$^a$ is indicated at 41$^a$ in Figure 2. The high points on these cams are circumferentially spaced on the sleeve approximately fifteen degrees apart or sufficiently so that the rocker arms will be oscillated in succession and in timing with the feed dog with which they are associated.

Associated with each link is a spring 44 which is attached to a lug 45 at the end of the link 24. At its outer end said spring passes through an opening in a bracket 46, thence between forked arms in a bracket 47 and a bar 47ª extending through an eye at the end of the spring serves as an anchorage for the spring.

This spring is a tension spring and holds the roller 42 in engagement with the cam so that when the cam projection 41 passes from beneath the roll then the rocker bar to which the link is attached will be returned to a position for receiving and supporting a strip. Associated with each link is a spring and as they all function in the same way the same numerals have been applied thereto as used in describing the spring associated with the link 24. The sheet will pass through the first operation cutter and be formed into strips and the strips will be simultaneously discharged by the transfer rolls onto the rocker bars. The strips, however, will be released one at a time and in succession beginning with the strip which is nearest the slitters which divide the strips into blanks.

The second operation slitters are of the well known construction and are in general like the blank cutting slitters shown in the Dodge patent. In Figure 11 one of the slitting units is shown. The upper arbor carrying the cutting disc is indicated at 48 and the disc mounted thereon at 49, the lower arbor is indicated at 50 and the co-operating cutting disc at 51. The feed chain 21 runs around the sprocket wheel 52 disposed in front of the cutters and the feed dogs 22 thereon will feed first one strip and then another through the cutters. This second operation slitter, as noted, is of the usual construction and further detailed description thereof is not thought necessary.

The blank forming machine so far as cutting the sheet into strips and the subsequent cutting of the strips into body blanks is of well known construction. The invention has to do with the handling of the strips and the feeding of the same one at a time and in succession to the blank forming cutters. When the strips leave the transfer rolls they are supported on the rocker bars. They are deposited thereon simultaneously. The rocker bars, however, are operated in sequence one after another beginning with the rocker bar nearest the blank forming cutters. The oscillation of the first rocker bar to release the strip is so timed relative to the feed dog that the strip supported thereby will be released so as to drop into the guideway below the rocker bars and immediately in advance of the dog which is to engage and advance the same.

The second rocker bar is timed so as to release the strip supported thereby in timed relation to the feed dog so that it will drop onto the guideway immediately in advance of the feed dog that is to engage the trailing side thereof and advance it to the blank forming cutters. The same is true with the other rocker bars. They operate in succession and in timing with the feed dogs associated therewith.

In Figure 8, which shows a slight modification, the first bar 43 is not a rocker bar but is merely a stationary bar having a curved portion at its upper side and functioning to support the advance edge of a strip, which is further supported by the ledge on the next adjacent rocker bar.

In the construction shown in the Dodge patent where the sheets are simultaneously released and slitters are limited to the producing of three strips from a sheet for the reason that if the machine be increased in width and an additional slitter added to cut the sheet into four strips the fourth strip would fall on a feed dog near the center thereof and might slip from the feed dog forward onto a strip so that two strips would be fed to the slitters at the same time. However, in applicant's construction wherein the sheets are released one at a time and in succession the number of strips has been increased to four and there is no limitation as to the number of strips that can be cut when they are released one at a time and in succession and in timing with the feed dogs.

It is obvious that minor changes in the details of construction may be made without departing from the spirit of the invention as set forth in the appended claims;

I claim:

1. A sheet feeding mechanism for body blank forming machines comprising a table having spaced guide bars for receiving the strips and directing the same, feed dogs uniformly spaced a greater distance than the width of the strips for engaging the trailing edge of each strip and feeding said strips sidewise in succession and in spaced relation along said table, a plurality of oscillatable means operable successively disposed above and extending across the guideway for receiving and supporting the strips at the under surface of the sheet, transfer rolls for simultaneously feeding a group of strips arranged side by side in an endwise direction onto said supporting means and means for independently releasing said strips in succession and in timing with the movement of the feed dogs whereby each strip will fall into said guideway immediately in advance of the feed dog that is to engage the strip and feed it along the table.

2. A sheet feeding mechanism for body blank forming machines comprising a table having spaced guide bars for receiving the strips and directing the same, feed dogs uniformly spaced a greater distance than the width of the strips for engaging the trailing edge of each strip and feeding said strips sidewise in succession and in spaced relation along said table, rocker bars extending across the guideway for receiving and supporting the strips, transfer rolls for simultaneously feeding a group of strips arranged side by side and in an endwise direction onto said rocker bars and means for independently rocking said bars for releasing the strips one at a time in succession and in timing with the feed dogs which engage the strips for feeding them along the table.

3. A sheet feeding mechanism for body blank forming machines comprising a table having spaced guide bars for receiving the strips and directing the same, feed dogs uniformly spaced a greater distance than the width of the strips for engaging the trailing edge of each strip and feeding said strips sidewise in succession and in spaced relation along said table, rocker bars extending across the guideway for receiving and supporting the straps, transfer rolls for simultaneously feeding a group of strips arranged side by side in an endwise direction onto said rockers, each rocker bar having an arm attached to the outer end thereof, a cam actuated lever and a link connecting said lever to said arm for oscillating said rocker to release the strip carried thereby, said cams operating in timing with the movement of the feed dogs whereby each strip will fall into said guideway immediately in advance of the feed dog that is to engage the strip and feed it along the table.

4. A sheet feeding mechanism according to claim 1 wherein the means disposed above and extending across the guideway receive and support the strip adjacent their leading and trailing edge portions.

5. A sheet feeding mechanism according to claim 1 wherein the means disposed above and extending across the guideway for receiving and supporting the strips includes bars having spaced apart surfaces at different elevations on which the trailing edge portion and leading edge portion of adjacent strips rest and dispose the strips in inclined position.

6. A sheet feeding mechanism according to claim 1 wherein the means disposed above and extending across the guideway for receiving and supporting the strips includes bars having spaced apart surfaces at different elevations on which the trailing edge portion and leading edge portion of adjacent strips rest and dispose the strips in inclined position, said bars having recesses, ledges at the bases of said recesses constituting the lower of said surfaces, and means to rock said bars so that said ledges will release the strips.

References Cited in the file of this patent

UNITED STATES PATENTS

| | | |
|---|---|---|
| 1,985,820 | Dodge | Dec. 25, 1934 |
| 2,554,095 | Diezel | May 22, 1951 |
| 2,668,591 | Winters | Feb. 9, 1954 |
| 2,672,931 | Maher | Mar. 23, 1954 |